(12) United States Patent
Wrobel et al.

(10) Patent No.: US 6,563,102 B1
(45) Date of Patent: May 13, 2003

(54) MOUNTING AND CONTROL SYSTEM FOR OPTICAL IMAGING SYSTEMS

(75) Inventors: Leslie Wrobel, Montreal (CA); Marcel Labrie, Laval (CA); Michael Emanuel, St-Laurent (CA)

(73) Assignee: Thomson-CSF Optronique Canada, Inc., Montreal (CA)

( * ) Notice: Subject to any disclaimer, the term of this patent is extended or adjusted under 35 U.S.C. 154(b) by 0 days.

(21) Appl. No.: 09/580,444

(22) Filed: May 30, 2000

Related U.S. Application Data

(63) Continuation-in-part of application No. 09/414,813, filed on Oct. 8, 1999, now abandoned.
(60) Provisional application No. 60/103,840, filed on Oct. 9, 1998.

(51) Int. Cl.[7] ............................................... H01L 27/00
(52) U.S. Cl. ................................... 250/208.1; 359/405
(58) Field of Search .............................. 250/208.1, 216, 250/239, 332; 359/405, 399, 401, 353, 356, 400, 402, 403, 413, 409; 384/35

(56) References Cited

U.S. PATENT DOCUMENTS

| | | | | |
|---|---|---|---|---|
| 3,509,792 A | | 5/1970 | Ruf | |
| 3,888,563 A | * | 6/1975 | Dierkes | 350/85 |
| 4,626,905 A | * | 12/1986 | Schmidt | 348/36 |
| 4,978,206 A | * | 12/1990 | Neuman et al. | 350/543 |
| 5,729,016 A | * | 3/1998 | Klapper et al. | 250/334 |
| 6,023,061 A | * | 2/2000 | Bodkin | 250/332 |

\* cited by examiner

*Primary Examiner*—Robert H. Kim
*Assistant Examiner*—Hoon K. Song
(74) *Attorney, Agent, or Firm*—Oblon, Spivak, McClelland, Maier & Neustadt, P.C.

(57) ABSTRACT

A mounting and control system for a sensor module of a driver viewer enhancement system located external of a vehicle. The mounting and control system including a tube for supporting the sensor module and that is interconnected to a sleeve bearing by a ball and socket joint that provides for the limited pivotal adjustment of the module about a horizontal axis. The sleeve bearing is support by a mounting block, which provides for rotational adjustment of the sensor module about a vertical axis. The sleeve bearing has an inner hollow region having rectangular and trapezoidal cross-sectional configurations that extend within two vertical perpendicular planes. The tube is free to pivot within the sleeve bearing in the plane including the trapezoidal cross-section only, thereby providing for elevational adjustment of the sensor module. The tube is restricted to rotation within the plane including the trapezoidal cross-section by a pin fixed to the sleeve bearing for slidably engaging a ball portion of the ball and socket joint.

27 Claims, 8 Drawing Sheets

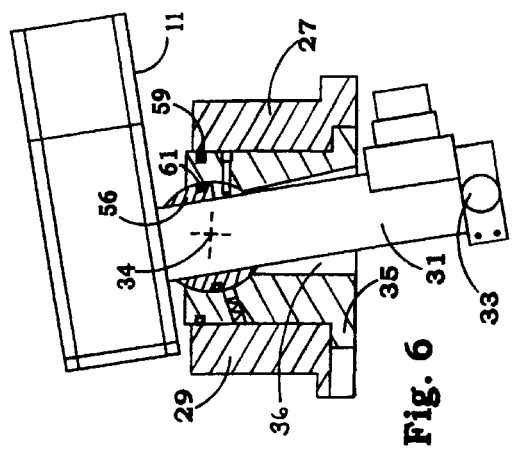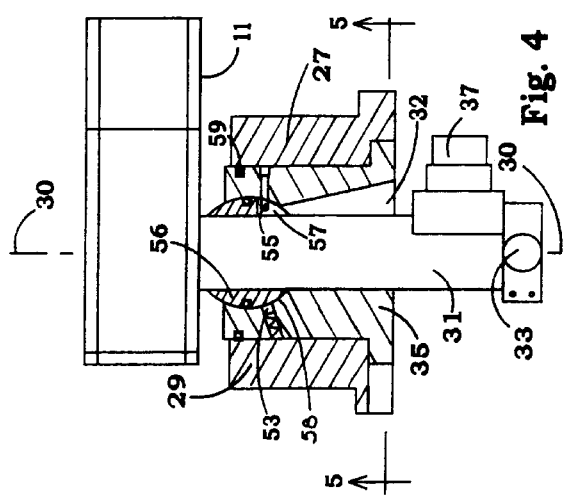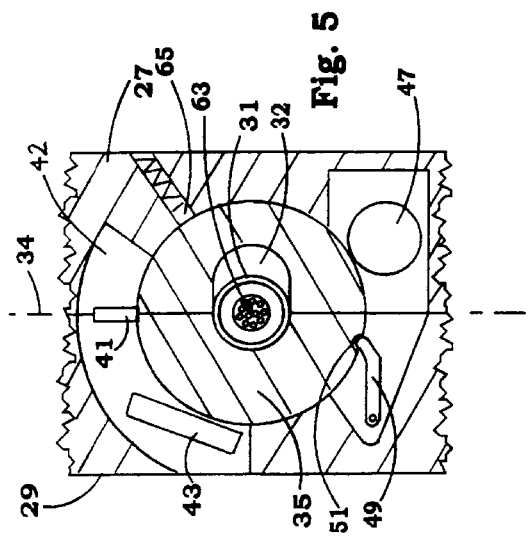

MOUNTING AND CONTROL SYSTEM FOR OPTICAL IMAGING SYSTEMS

CROSS REFERENCE TO RELATED APPLICATION

This patent application is a continuation-in-part of application Ser. No. 09/414,813 filed Oct. 8, 1999, which claims priority upon U.S. Provisional Patent Application Ser. No. 60/103,840, filed on Oct. 9, 1998.

BACKGROUND OF THE INVENTION

1. Field of the Invention

The present invention relates generally to viewing systems, and more particularly to a mount and control for a driver viewer enhancement system.

2. Discussion of the Background

In recent years thermal imaging systems, based on uncooled detector arrays, have come to be an important aid in driving at night and under adverse weather and battlefield conditions. These systems are generally known as driver viewer enhancement (DVE) systems. The application of such DVE systems in combat vehicles has caused problems that are derived from the fact that the DVE system is typically configured in a periscope fashion. The openings in the vehicle armor are typically rectangular in shape and approximately 2.5 inches wide by 6 to 10 inches long. The DVE systems normally replace periscope day sights in these openings. The DVE systems typically include a head protruding out of the armor through a mounting block adaptor. The head consists of a window, a folding mirror, and three or more tenses. An elevation control mechanism is required for the folding mirror to provide a wide field of regard. The optics (lenses) are placed vertically in a cylinder neck within the mounting block, thereby permitting azimuth movement of the periscope. A seal is required in the neck. The uncooled detector array and electronics are in a housing under the mounting block inside the vehicle.

One problem with such periscope based systems is that they are more costly due to the need for extra optical elements, i.e., a folding mirror, an actuation mechanism, and a window. It is advantageous to reduce the cost of such a system. A unique new configuration is needed that utilizes a forward looking (telescopic) sensor instead of a system using periscope architecture.

A second problem with periscope based systems is the large amount of space they require and the limited number of mounting positions that are possible with such a configuration. It is desirable that the sensor module be as small as possible to allow maximum flexibility in mounting the unit in armored vehicles. In some vehicles the protruding housing underneath the mounting block adaptor of a periscope based system obstructs hatch movement and driver egress.

SUMMARY OF THE INVENTION

An object of the present invention is to provide a cost effective driver viewer enhancement system. This object is achieved through the use of a mounting and control system that provides for a forward looking (telescopic) sensor instead of a system using periscope architecture.

An additional object of the present invention is to provide a compact mounting and control system for a driver viewer enhancement system that provides for maximum flexibility in mounting the unit within a vehicle. This object is achieved through the advantageous use of a mounting block adaptor for the sensor module that is simple and cost effective in construction to permit quick and easy installation and removal in a vehicle opening, simple environmental sealing, independent elevational and rotational (or azimuth) movement, simple one hand operation, and low mounting block control adaptor cost.

In a particularly preferred embodiment, the invention provides for mechanical interconnection between a controllable optical imaging sensor module located external of a vehicle and an operator control located internal of the vehicle that includes an orthogonal journal arrangement for facilitating internal operator control of the sensor module. The sensor module is supported by a tube that is interconnected to a sleeve bearing by a ball and socket joint that provides for the limited pivotal adjustment of the module about a horizontal axis. The sleeve bearing is support by a mounting block, which provides for rotational adjustment of the sensor module about a vertical axis. The sleeve bearing has a generally cylindrical outer surface, and an inner hollow region having rectangular and trapezoidal cross-sectional configurations that extend within two vertical perpendicular planes. The tube is free to pivot within the sleeve bearing in the plane including the trapezoidal cross-section only, thereby providing for elevational adjustment of the sensor module. The tube is restricted to rotation within the plane including the trapezoidal cross-section by a pin fixed to the sleeve bearing for slidably engaging a ball portion of the ball and socket joint.

BRIEF DESCRIPTION OF THE DRAWINGS

The mounting and control system for an optical imaging device according to the invention is explained in detail by means of the examples illustrated in basic diagrams in FIGS. 1 to 10.

A more complete appreciation of the invention and many of the attendant advantages thereof will be readily obtained as the same becomes better understood by reference to the following detailed description when considered in connection with the accompanying drawings, wherein:

FIG. 4 is a partial cross-sectional view along the lines 4—4 of FIG. 3;

FIG. 5 is a cross-sectional view along the lines 5—5 of FIG. 4;

FIG. 6 is a partial cross-sectional view similar to FIG. 4, but depicting the imaging device aimed at an increased elevation;

DETAILED DESCRIPTION OF THE PREFERRED EMBODIMENTS

Figure 1:
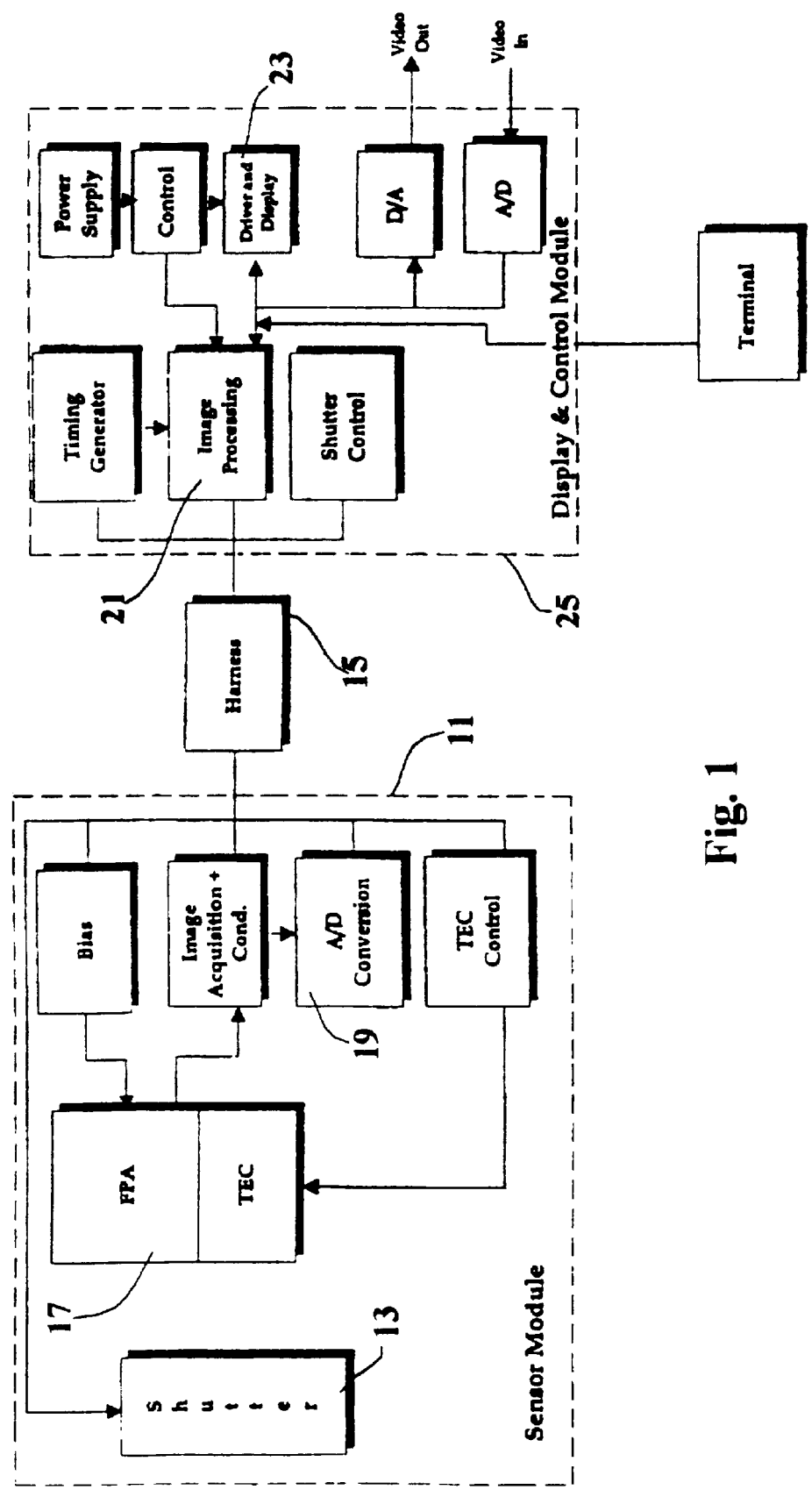
FIG. 1 is a schematic diagram of an optical imaging system.
Figure 2:
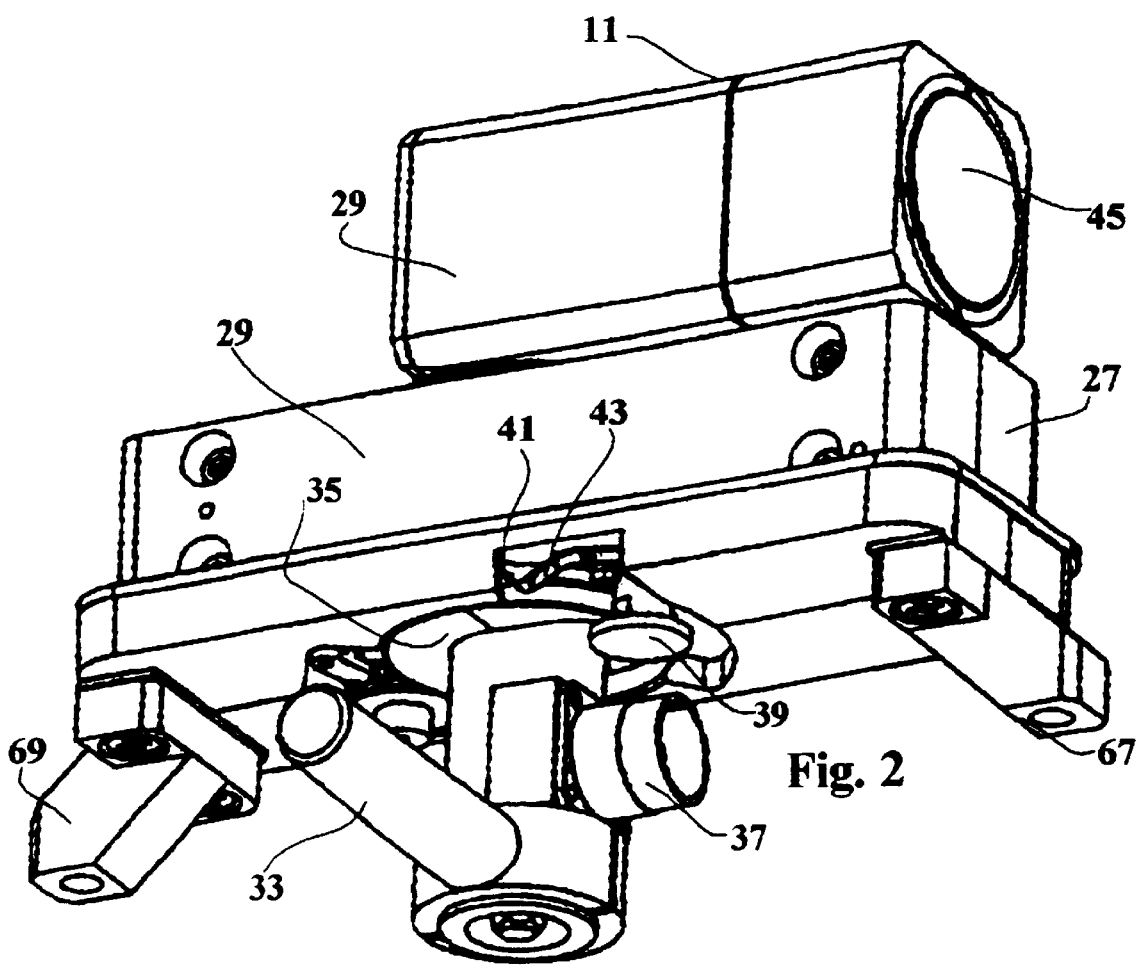
FIG. 2 is an isometric view of the mounting and control system of the present invention in a stowage position.

Referring now to the drawings, where like reference numerals identify the same or corresponding parts throughout the several views, FIGS. 1 through 10 depict a mounting and control system for an optical imaging system.

In FIG. 1, an optical imaging device includes an infrared light path to the sensor array 17 controlled by shutter 13 in the sensor module or optical imaging device 11. The sensor module is not discussed in detail herein so as not to unnecessarily complicate the present description, but are more completely described in copending application Ser. No. 09/248,507, filed Feb. 18, 1999, which is hereby incorporated by reference. The sensor module 11 includes an optical imaging device having an array of infrared radiation detector cells 17 and an optical system consisting exclusively of refractive optical components, including an objective lens 45 (see FIG. 2), for projecting the infrared radiation emanating from a scene onto the array of infrared sensitive cells, and a housing containing the array of cells and the optical system and part of the system electronics. The array information is converted to a digital form at 19 and transmitted from the optical imaging or sensor module 11 to the image processing, display and control module 25 by way of harness 15. Harness 15 includes a modulation-free bidirectional digital communication path and passes through a hollow member depicted in FIGS. 2–10. The image processing and display module 25 is spaced from the optical imaging device for displaying an image of the scene. After processing by the image processing circuitry 21, the information is displayed at 23. The sensor module 11 is preferably limited to an overall size of approximately 2.5 inch square by 6.0 inch long. Reference to the aforementioned copending application may be had for further details of the electrical components illustrated in FIG. 1.

Referring generally to FIGS. 2–10, the sensor module 11 is supported near the upper end of a hollow tube or support member 31 which extends downwardly through a mounting block or mounting member 27, 29 terminating at a control handle 33. The tube 31 is preferably cylindrical in shape, although alternative shapes can be used, which will be readily apparent to those skilled in the art. The control handle 33 extends orthogonally from the tube 31. The mounting block 27, 29 includes two half portions that are rigidly fixed together and the mounting block 27, 29 is typically fixed to a vehicle by flanges 67 and 69. The interior of the tube 31 houses an image information conveying cable 63 which interconnects the sensor module 11 with the display and control module 25 by way of a further cable (not shown) which connects to the electrical connector 37. The handle 33 provides for control of the positioning of the sensor module 11 by an operator.

The tube 31 is positioned within a hollow sleeve bearing 35. As will be discussed in more detail below, the tube 31 is prevented from rotating with respect to the sleeve bearing 35 about a vertical axis 30 due to interference between a pin 55 that extends from the sleeve bearing 35 and into a slot 57 on a portion of the tube 31. However, the sleeve bearing 35 is configured to rotate within the mounting block 27, 29 about the vertical axis 30. In the preferred embodiment, the sleeve bearing 35 and, therefore, the sensor module 11 are configured to rotate within the mounting block 27, 29 about vertical axis 30 through slightly more than thirty degrees to either side of a straight forward position (depicted, for example, in FIG. 3). Additionally, the sleeve bearing 35 and sensor module 11 are configured to rotate about vertical axis 30 ninety degrees from the straight forward position depicted in FIG. 3 to a stowage position depicted in FIG. 2. Therefore, in total, the sleeve bearing 35 is free to rotate within the mounting block 27, 29 through a preferred range of about one hundred and twenty degrees about the vertical axis 30, although alternative ranges can extend the freedom of rotation to a full 360 degrees or beyond if desired.

In the preferred embodiment, the range of rotational movement of the sleeve bearing 35 within the mounting block 27, 29 is defined by control stop devices. At least one end stop pin 41 extends from an outer surface of the sleeve bearing 35 and is received within at least one end stop recess 42 in the mounting block 27, 29. The end stop recess 42 restricts the rotation of the sleeve bearing 35 and the sensor module 11 by interfering with and limiting the movement of the end stop pin 41, thereby providing azimuth control stop devices. A portion of the end stop recess 42 includes a releasable latch-type member or leaf spring 43, which is positioned in the end stop recess 42 such that when the sensor module 11 is in the stowage position the pin 41 is engaged with member 43. Once the end stop pin 41 travels into the stowage position, the member 43 prevents or deters the pin end stop 41 from moving out of the stowage position, thereby preventing or deterring the sensor module 11 from rotating about vertical axis 30 out of the stowage position.

In the stowage position, the sensor module 11 is folded within the mounting block 27, 29, which will protect the sensor module 11 during installation in the vehicle, dismounting from the vehicle, or when the sensor module 11 is not in use. An added advantage of the stowage position is that when the sensor module 11 is in this position the objective lens 45 is protected within the protective cowling provided in most vehicles. Note that when the sensor module 11 is in the stowage position the handle 33 is oriented towards the operator, which allows the operator to easily grasp and manipulate the sensor module 10 using the handle 33.

Figure 3:
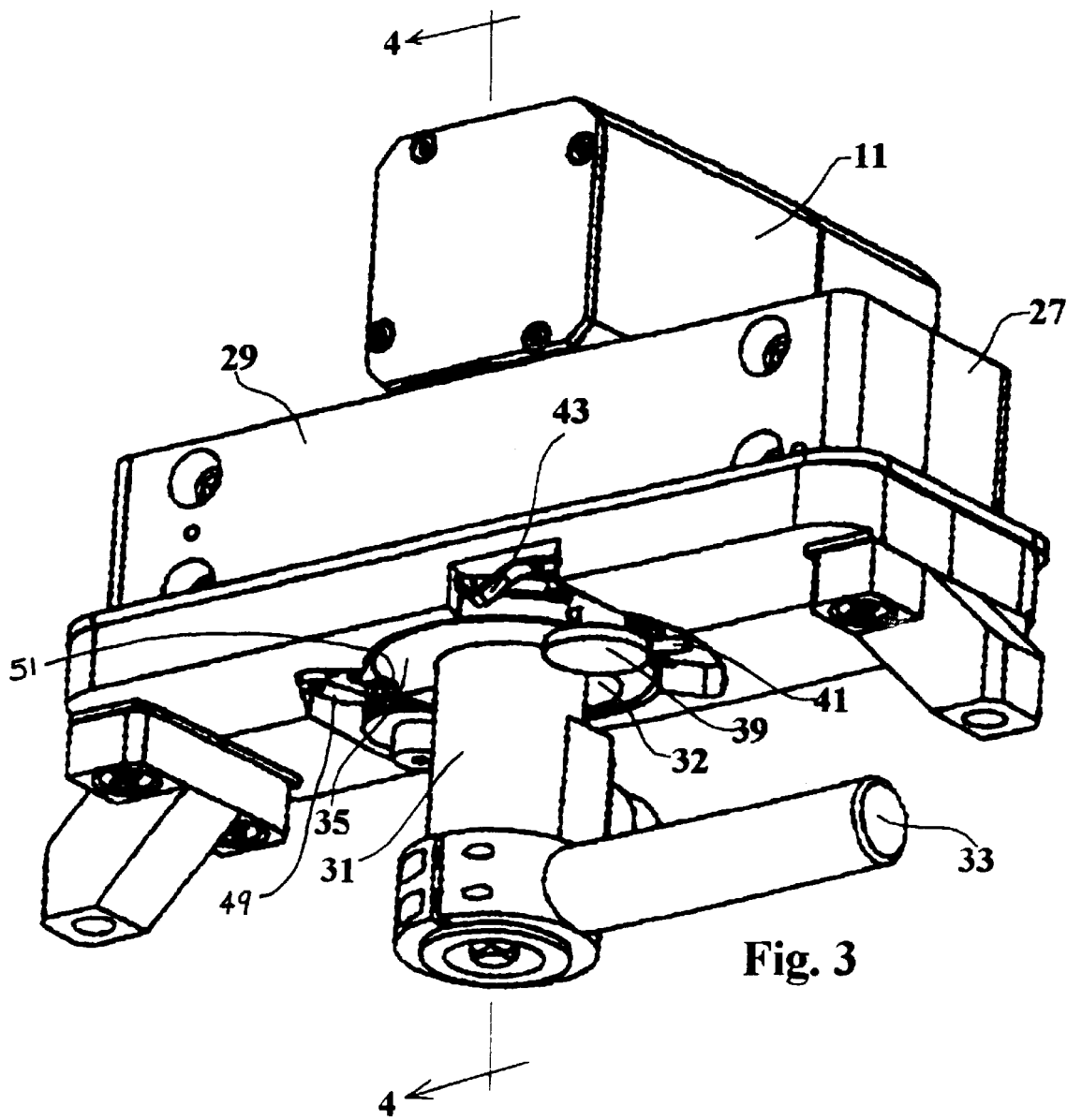
FIG. 3 is an isometric view similar to FIG. 2, but depicting the imaging device in the straight forward position.
Figure 7:
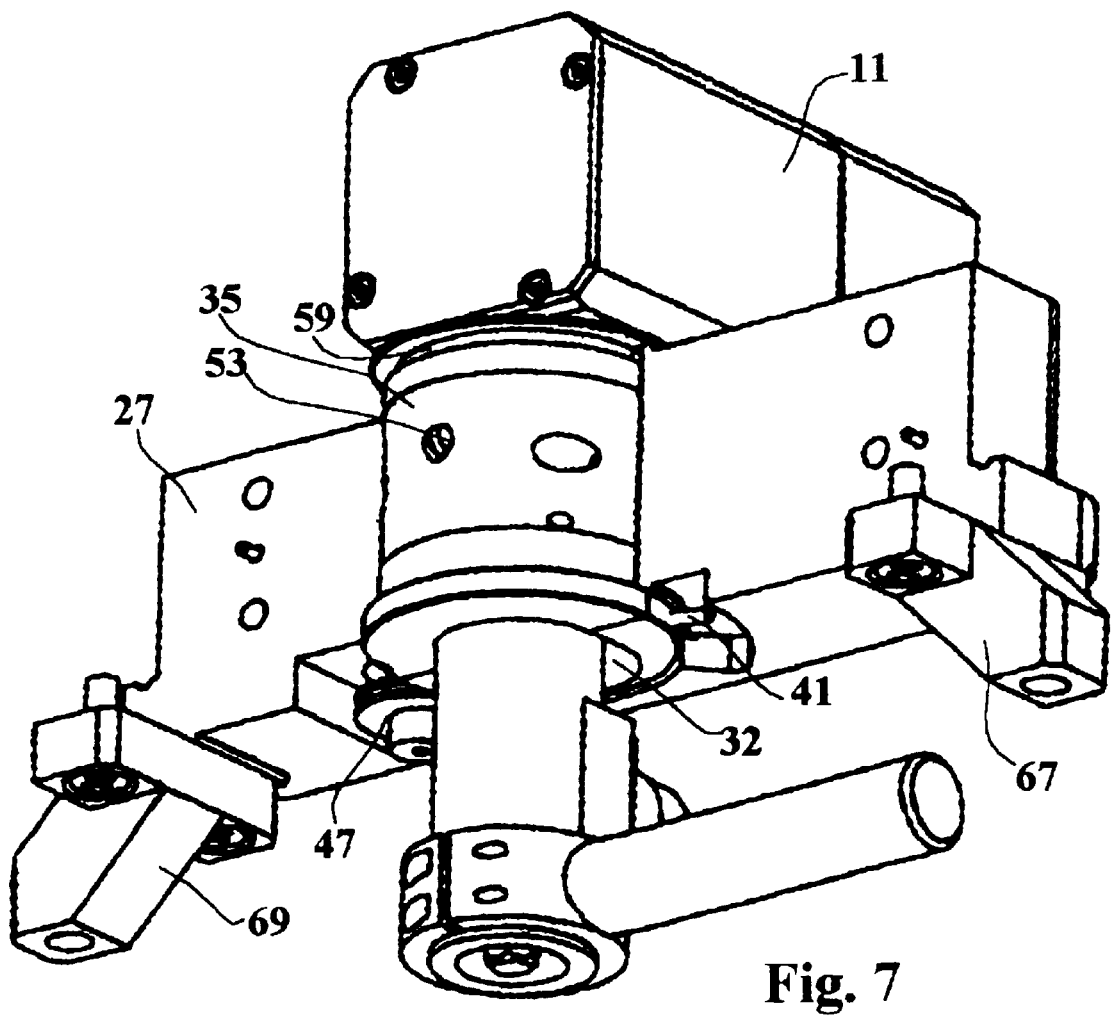
FIG. 7 is an isometric view similar to FIG. 3, but with one housing portion removed to reveal the sleeve bearing.
Figure 8:
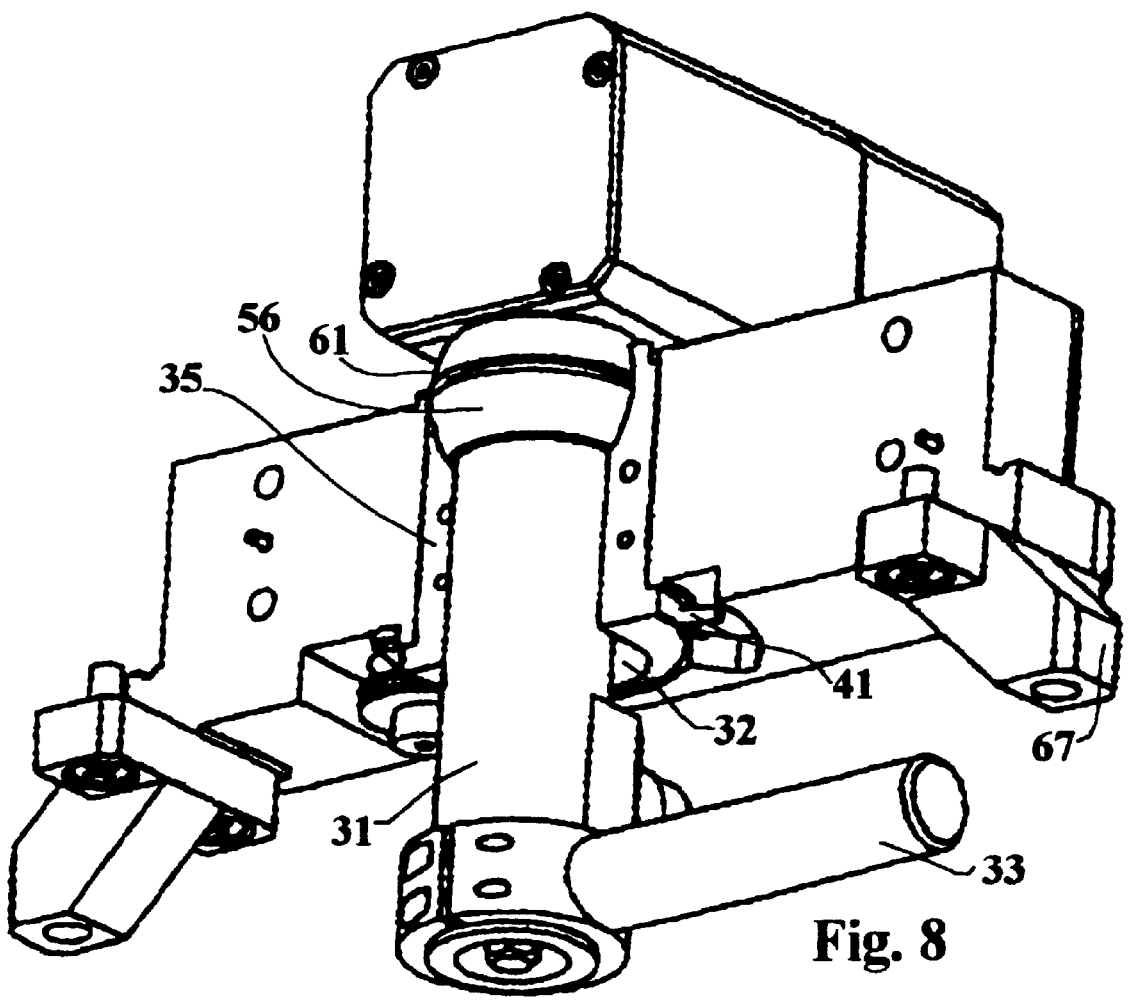
FIG. 8 is an isometric view similar to FIG. 7, but with one portion of the sleeve bearing removed to reveal the elevation ball joint.
Figure 9:
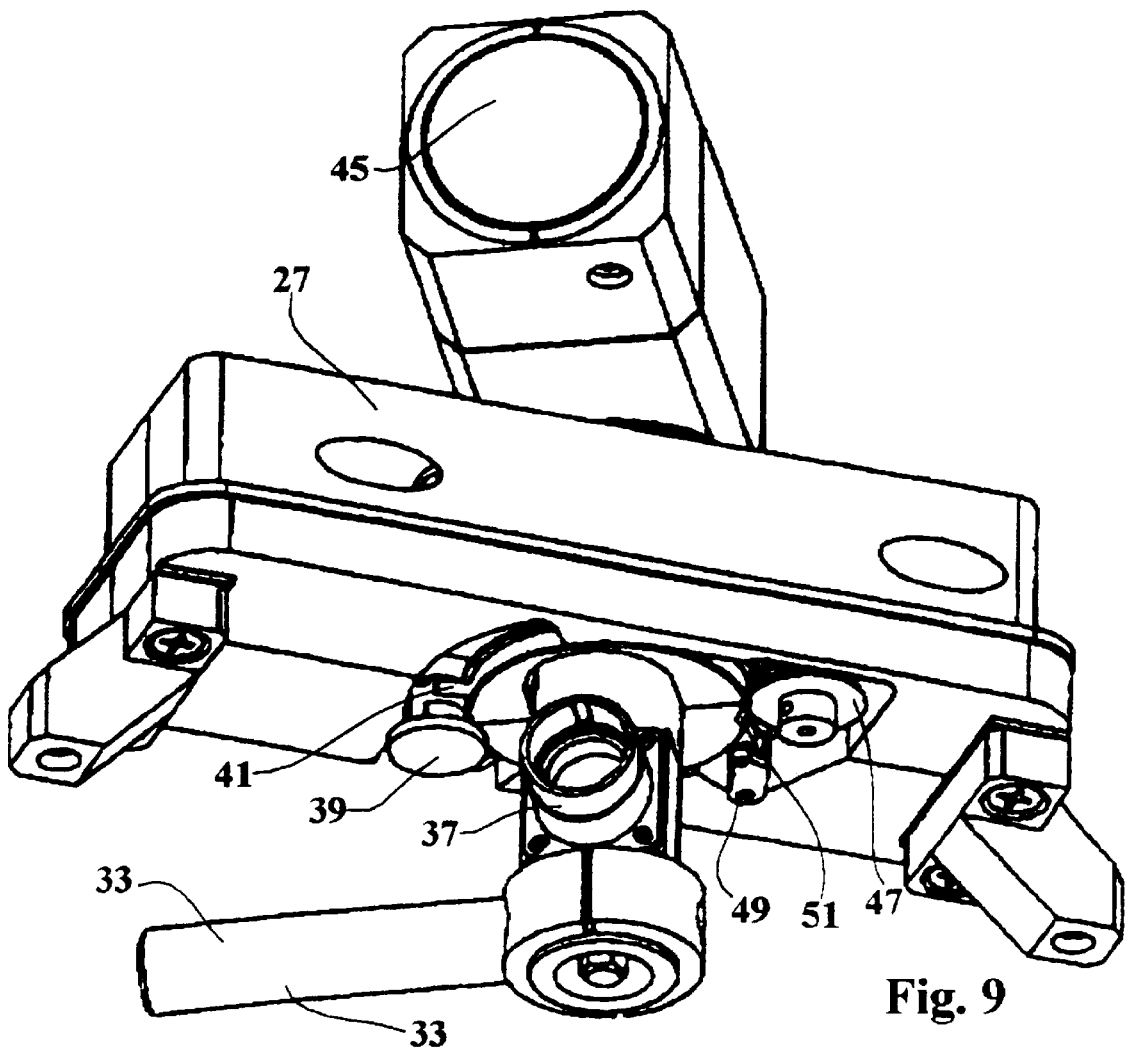
FIG. 9 is an isometric view of the mounting and control system of the present invention from a different perspective and depicting the imaging device in one preferred extreme azimuth position.
Figure 10:
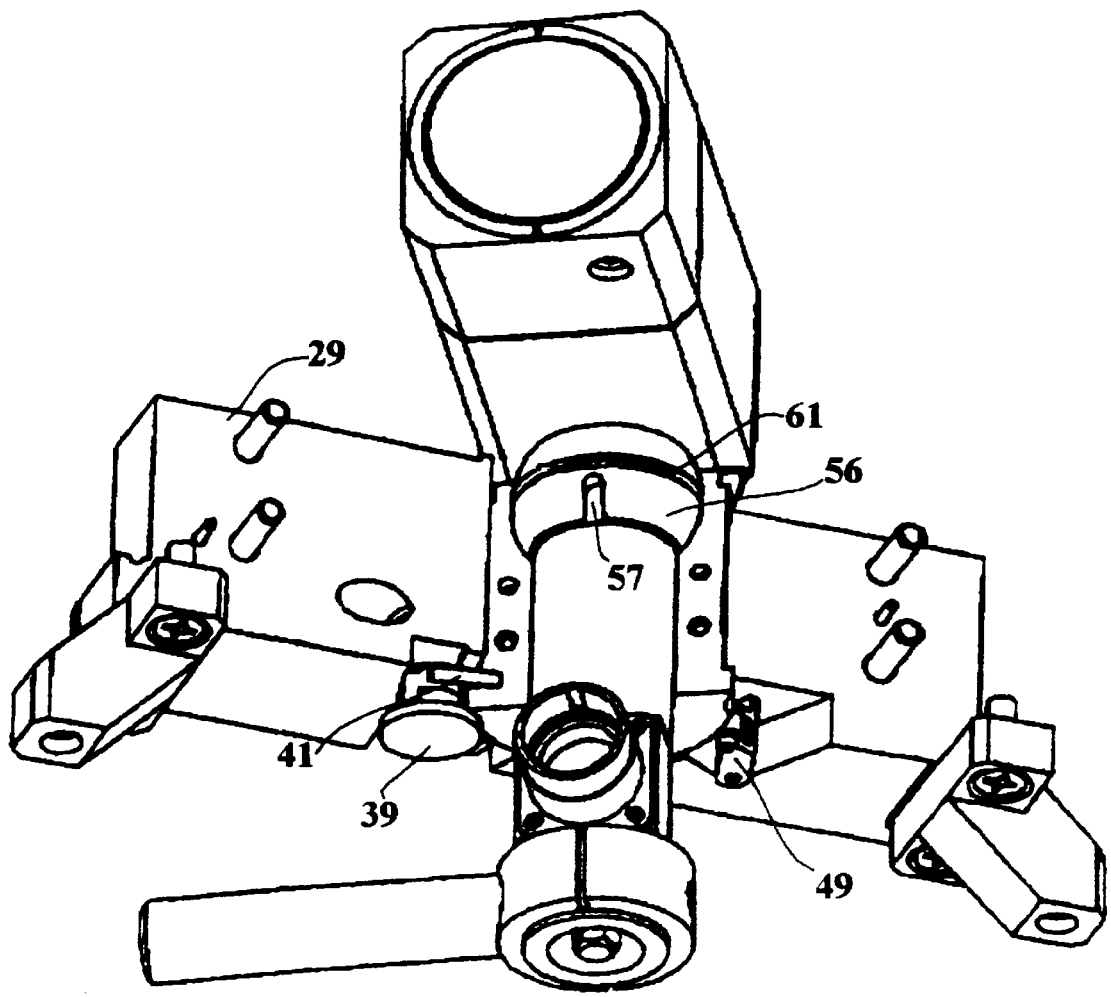
FIG. 10 is an isometric view similar to FIG. 9, but with one housing portion and one portion of the sleeve bearing removed to reveal the elevation ball joint.

The latch-type member 43 has a release lever or button 39 that, when depressed, allows the end stop pin 41 to move out of the stowage position without interference or with minimal interference from member 43. The button 39 is positioned such that the operator can grasp the handle 33 with one hand and simultaneously actuate the button 39 with the same hand, for example by using the back side of the hand. The sleeve bearing 35 further includes a bearing notch 51, and the mounting block 27, 29 further includes a spring loaded roller 49, which interact to provide a detent neutral or forward position, as depicted in FIGS. 3 and 5. The spring loaded roller 49 mates with the notch 51 when the sensor module 11 and sleeve bearing 35 are oriented in the straight forward position, thereby providing slight deterrence from rotation at this position. The operator can overcome this deterrence by using the handle 33 to rotate the sleeve bearing 35 and the sensor module 11, thereby forcing the spring loaded roller 49 out from notch 51.

A potentiometer roller mechanism 47 (FIGS. 5, 7 and 9) is provided on the mounting block 27, 29 that has a rubberlike peripheral surface and is spring loaded against sleeve bearing 35 to give an azimuth directional reading of the sensor module 11. The directional readout may be displayed in a graphical mode on the display 23.

The sleeve bearing 35 is formed in two halves and has a generally cylindrical outer surface and an inner hollow region 36 including a relieved region 32 that allows for the limited pivotal motion of the tube 31 about a horizontal axis 34 within the sleeve bearing 35. This relieved region 32 gives the opening in which the tube 31 resides a race track shaped cross-sectional configuration, as depicted in FIG. 5. The inner hollow region 36 is generally depicted in FIG. 6 and has rectangular and trapezoidal cross-sectional configurations that extend within two vertical perpendicular planes that intersect along axis 30. The tube 31 is free to pivot within the sleeve bearing 35 in the plane including the trapezoidal cross-section only, thereby providing for elevational adjustment of the sensor module 11.

A ball and socket joint joins the tube 31 and sleeve bearing 35. Such a ball and socket joint is readily adapted to simple sealing techniques, as will be readily apparent to one skilled in the art. The ball and socket joint includes a spherical ball portion 56 that is press-fit onto the tube 31. The spherical ball portion 56 of the tube 31 is received within a recessed spherical socket portion 58 on the interior of the sleeve bearing 35. The ball portion 56 has a slot 57 (as discussed earlier) that engages a pin 55 in the socket portion 58 of the sleeve bearing 35, which prevents the sensor from having pitch rotation. In the preferred embodiment the pin 55 is positioned to extend perpendicularly to axis 34 and in the same direction as the objective lens 45 of the imaging device 11 in order to insure restriction of motion of the imaging device 11 to two perpendicular planes, thereby providing for elevational adjustment (along the plane in which the trapezoidal cross-sectional configuration of the inner hollow region of sleeve bearing 35 extends, and about horizontal axis 34) and rotational adjustment along a horizontal plane about the vertical axis 30.

The sensor module 11 rotates about axis 34 for elevational adjustment and is aided by a friction mechanism 53 (see FIGS. 4, 6 and 7) for maintaining a selected elevational position of the sensor module 11. Compare FIG. 4 where the sensor module 11 is directed substantially horizontally with FIG. 6 where handle 33 has been pushed forward and the sensor module has been elevated to nearly its preferred maximum elevation of ten to fifteen degrees. The friction mechanism 53 will provide sufficient friction between the socket portion 58 and the ball portion 56 to maintain the orientation of the sensor module 11 depicted in FIG. 6, unless an operator overcomes the friction by moving the handle 33. A friction mechanism 65 (depicted in FIG. 5), similar to friction mechanism 53) is implemented for maintaining a selected rotational position of the sensor module 11 about vertical axis 30 by providing friction between the sleeve bearing 35 and the mounting block 27, 29. A seal between the ball portion 56 of the tube 31 and the socket portion 58 of the sleeve bearing 35 is achieved with an O-ring 61. Another O-ring 59 sealingly engages both the sleeve bearing 35 and the cylindrical opening in the mounting block 27, 29.

In summary, the simplicity of this mounting block control adaptor provides simple environmental sealing, easy one hand operation for independent azimuth and elevation controls, and a protective stowage position. The mounting block control adaptor can be used in various applications. It is particularly well suited to for use with a forward looking sensor module in the majority of combat vehicles. The adaptor enables the use of a driver viewer enhancement system in vehicles where there is minimum amount of free space for protrusion and volume inside the vehicle under the mounting block. As will be readily apparent to one of skill in the art, the present invention also readily lends itself to adaptation as a motorized control system with the inclusion of motors for providing rotational and elevational controls and motors or other mechanisms for controlling the release button 39.

Numerous variations of the present invention are possible in light of the above teachings. It is therefore to be understood that within the scope of the appended claims, the present invention can be practiced other than as specifically described herein.

What is new and desired to be secured by Letters Patent of the United States is:

1. A mounting and control system for mounting an optical imaging device to an enclosed structure, comprising:

a support member having an optical imaging device including an optical system and an electronic detection system fixed to an end of the support member;

a bearing configured to support said support member and to provide for rotational movement of said support member about a horizontal axis;

a mounting member configured to support said bearing and to provide for rotational movement of said bearing about a vertical axis;

a control handle mechanically connected to said support member at an opposing end opposite to the end having the electronic detection system fixed thereto; and a display electrically connected to said imaging device and located remote to said imaging device, wherein said mounting member is configured to mount said optical imaging device to said enclosed structure such that said electronic detection system is external to the enclosed structure and said control handle is internal to the enclosed structure.

2. The system of claim 1, wherein said bearing has an inner hollow region configured to receive said support member, said inner hollow region having a generally trapezoidal cross-section extending in a first vertical plane and a generally rectangular cross-section extending in a second vertical plane that is perpendicular to the first vertical plane, and wherein said support member is free to rotate with respect to said bearing in the first vertical plane only.

3. The system of claim 1, wherein:

said support member and said bearing are joined together by a ball and socket joint;

said bearing has an outer surface that is generally cylindrical in shape; and said outer surface of said bearing is received within a generally cylindrical opening in said mounting member.

4. The system of claim 3, further comprising:

a first O-ring configured to seal said ball and socket joint; and a second O-ring configured to sealingly engage said outer surface of said bearing within said cylindrical opening in said mounting member.

5. The system of claim 3, wherein said ball and socket joint comprises:

a ball portion on said support member, said ball portion having a slot extending in a vertical direction;

a socket portion on said bearing configured to receive said ball portion; and a pin fixed to said socket portion and engaging said slot.

6. The system of claim 5, wherein said slot is configured to limit a freedom of rotation of said support member about the horizontal axis.

7. The system of claim 1, further comprising a control handle attached to said support member at an end opposing said end having the optical imaging device fixed thereon.

8. The system of claim 1, wherein said support member defines a passageway that can be used to house a cable for conveying information from the optical imaging device to said display.

9. The system of claim 1, further comprising a roller attached to said mounting member and configured to mate with a notch on said bearing when the optical imaging device is oriented in a forward position, said roller and said notch deterring rotation between said mounting member and said bearing at said forward position.

10. The system of claim 1, further comprising a stop pin extending from said bearing and being received within a recess in said mounting member, said recess being configured to limit rotation about the vertical axis of said bearing with respect to said mounting member.

11. The system of claim 10, further comprising:
a latch attached to said mounting member and configured to selectively engage and hold said stop pin; and
a release operatively engaged to said latch and configured to selectively disengage said latch from said stop pin.

12. The system of claim 1, further comprising means coupled to said bearing for sensing a rotational direction of the optical imaging device about the vertical axis.

13. A mounting and control system for mounting an optical imaging device to an enclosed structure, comprising:
a support member having an optical imaging device including an optical system and an electronic detection system fixed at an end of the support member;
means supporting said support member for rotational movement about a horizontal axis and for rotational movement about a vertical axis;
means for manually controlling movement of the electronic detection system, said means for manually controlling being mechanically connected to said support member at an opposing end opposite to the end having the electronic detection system fixed thereto; and
means for displaying images obtained by said optical imaging device, said means for displaying being remote to said optical imaging device, wherein said means for supporting said support member is configured to mount said optical imaging device to said enclosed structure such that said electronic detection system is external to the enclosed structure and said control handle is internal to the enclosed structure.

14. The system of claim 13, wherein:
said first means comprises a ball and socket joint; and
said second means comprises a bearing having a generally cylindrical outer surface received within a generally cylindrical opening.

15. The system of claim 14, wherein said ball and socket joint comprises:
a ball portion on said support member received within a socket portion on said bearing, said ball portion having a slot extending in a vertical direction; and
a pin fixed to said socket portion and engaging said slot.

16. The system of claim 15, wherein said slot is configured to limit a freedom of rotation of said support member about the horizontal axis.

17. The system of claim 13, wherein said first means comprises a bearing having an inner hollow region configured to receive said support member, said inner hollow region having a generally trapezoidal cross-section extending in a first vertical plane and a generally rectangular cross-section extending in a second vertical plane that is perpendicular to the first vertical plane, and wherein said support member is free to rotate with respect to said bearing in the first vertical plane only.

18. An optical imaging system for a vehicle comprising:
a sensor module including an optical system and an electronic detection system located external of the vehicle;
an image display module located within the vehicle;
a mounting and control system configured to support said sensor module and to allow an operator to orient said sensor module, said mounting and control system including:
a support member attached to said sensor module,
a bearing configured to support said support member and to provide for rotational movement of said support member about a horizontal axis,
a handle mechanically connected to said support member at an opposing end opposite to the end having the electronic detection system fixed thereto, and
a mounting member configured to support said bearing and to provide for rotational movement of said bearing about a vertical axis, wherein said mounting member is configured to mount said optical imaging device to said vehicle such that said electronic detection system is external to the vehicle and said control handle is internal to the vehicle.

19. The system of claim 18, wherein said sensor module comprises:
an array of infrared radiation detector cells as said electronic detection system;
an optical system consisting exclusively of refractive optical components for projecting infrared radiation emanating from a scene onto said array of infrared radiation detector cells as said optical system; and
a housing containing said array of infrared radiation detector cells and said optical system.

20. The system of claim 19, wherein said support member defines a passageway, the optical imaging system further comprising:
an image processing and display module spaced from said sensor module and configured for displaying an image from the scene; and
a modulation-free bidirectional digital communication path passing through said passageway and coupling said sensor module with said image processing and display module.

21. A mounting and control system for mounting an optical imaging device to a structure, comprising:
a single hollow support member having an optical imaging device including an optical system and an electronic detection system fixed to an end of the hollow support member;
a single sleeve bearing configured to support said hollow support member in such a way to provide for rotational movement of said hollow support member about a horizontal axis;
a mounting member configured to support said sleeve bearing within the mounting member in such a way to provide rotational movement of said hollow support member and said sleeve bearing about a vertical axis, and to mount said mounting and control system to the structure;
a display located remote to said imaging device and electrically connected to said imaging device by way of a hardwired medium, wherein said hollow support member provides a cavity for routing said hardwired medium through said structure.

22. The system of claim 21, wherein:
said hollow support member and said sleeve bearing are joined together by a ball and socket joint;
said sleeve bearing has an outer surface that is generally cylindrical in shape; and
said outer surface of said sleeve bearing is received within a generally cylindrical opening in said mounting member.

23. The system of claim 22, further comprising:

a first O-ring configured to seal said ball and socket joint; and a second O-ring configured to sealingly engage said outer surface of said sleeve bearing within said cylindrical opening in said mounting member.

24. The system of claim 22, wherein said ball and socket joint comprises:

a ball portion on said hollow support member, said ball portion having a slot extending in a vertical direction;

a socket portion on said sleeve bearing configured to receive said ball portion; and a pin fixed to said socket portion and engaging said slot, wherein said slot is configured to limit a freedom of rotation of said hollow support member about the horizontal axis.

25. The system of claim 21, further comprising a stop pin extending from said sleeve bearing and being received within a recess in said mounting member, said recess being configured to limit rotation about the vertical axis of said sleeve bearing with respect to said mounting member.

26. The system of claim 25, further comprising:

a latch attached to said mounting member and configured to selectively engage and hold said stop pin; and a release operatively engaged to said latch and configured to selectively disengage said latch from said stop pin.

27. The system of claim 21, wherein said sleeve bearing comprises a bearing having an inner hollow region configured to receive said support member, said inner hollow region having a generally trapezoidal cross-section extending in a first vertical plane and a generally rectangular cross-section extending in a second vertical plane that is perpendicular to the first vertical plane, and wherein said support member is free to rotate with respect to said sleeve bearing in the first vertical plane only.

* * * * *

UNITED STATES PATENT AND TRADEMARK OFFICE
CERTIFICATE OF CORRECTION

PATENT NO. : 6,563,102 B1
DATED : May 13, 2003
INVENTOR(S) : Wrobel et al.

It is certified that error appears in the above-identified patent and that said Letters Patent is hereby corrected as shown below:

<u>Title page,</u>
Item [63], Related U.S. Application Data and Item [60] should read:
-- Related U.S. Application Data
[63] Continuation of application No. 09/414,813, filed on Oct. 8, 1999, now abandoned.
[60] Provisional application No. 60/103,840, filed on Oct. 9, 1998. --

Signed and Sealed this

Twenty-third Day of September, 2003

JAMES E. ROGAN
*Director of the United States Patent and Trademark Office*